United States Patent
Oh et al.

(10) Patent No.: US 12,488,272 B2
(45) Date of Patent: Dec. 2, 2025

(54) NEURAL NETWORK ESTABLISHING METHOD FOR QUANTUM READOUT, METHOD FOR MITIGATING QUANTUM READOUT ERROR USING NEURAL NETWORK AND APPARATUS THEREOF

(71) Applicant: Research & Business Foundation Sungkyunkwan University, Suwon-si (KR)

(72) Inventors: Byung Du Oh, Seoul (KR); Jihye Kim, Daegu (KR); Kyungdeock Park, Hwaseong-si (KR); Yonuk Chong, Seoul (KR); Euyheon Hwang, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 583 days.

(21) Appl. No.: 18/074,828

(22) Filed: Dec. 5, 2022

(65) Prior Publication Data
US 2023/0177377 A1 Jun. 8, 2023

(30) Foreign Application Priority Data
Dec. 3, 2021 (KR) .......................... 10-2021-0171879

(51) Int. Cl.
*G06N 10/40* (2022.01)
*G06N 10/70* (2022.01)
(52) U.S. Cl.
CPC ............. *G06N 10/40* (2022.01); *G06N 10/70* (2022.01)

(58) Field of Classification Search
USPC ........................................................ 716/100
See application file for complete search history.

(56) References Cited

U.S. PATENT DOCUMENTS

| 5,339,818 A * | 8/1994 | Baker ................... G16H 50/20 |
| | | 600/490 |
| 2020/0294287 A1* | 9/2020 | Schlemper ............ G16H 30/40 |
| 2021/0081779 A1 | 3/2021 | Kanazawa |

FOREIGN PATENT DOCUMENTS

| CN | 107192898 A * | 9/2017 | ............ G01R 29/26 |
| EP | 3 934 103 A1 | 1/2022 | |

(Continued)

OTHER PUBLICATIONS

Shor, Peter W. "Scheme for reducing decoherence in quantum computer memory." *Physical review A* vol. 52. Issue 4 (1995): R2493. pp 1-4.

(Continued)

*Primary Examiner* — Brian Ngo
(74) *Attorney, Agent, or Firm* — NSIP Law

(57) ABSTRACT

The present disclosure relates to a quantum computer technology and a method in which a learning apparatus a neural network for quantum readout acquires a plurality of actual measurement results including noise in quantum readout using a quantum circuit, acquires an ideal measurement result of the quantum circuit in correspondence to each of the plurality of actual measurement results including noise, creates training data from a set of the actual measurement results including noise and the ideal measurement results, and trains a neural network for mitigating errors, which are generated in quantum readout, using the created training data.

20 Claims, 7 Drawing Sheets

(56) References Cited

FOREIGN PATENT DOCUMENTS

| | | |
|---|---|---|
| KR | 10-2019-0007375 A | 1/2019 |
| KR | 10-2020-0097787 A | 8/2020 |
| KR | 10-2021-0134363 A | 11/2021 |

OTHER PUBLICATIONS

Steane, Andrew M. "Error correcting codes in quantum theory." *Physical Review Letters* vol. 77. Issue 5 (1996): pp. 793-797.

Kim, Changjun, Daniel K. Park, and June-Koo Kevin Rhee. "Quantum Circuit Error Mitigation Via Convolutional Neural Network." 2020 Korean Society of Telecommunications Fall Conference, 2020. (pp. 102-103).

Korean Office Action issued on Jan. 22, 2025, in corresponding Korean Patent Application No. 10-2021-0171879. (9 pages in Korean).

\* cited by examiner (a)  (b)

(a)  (b)

FIG. 7
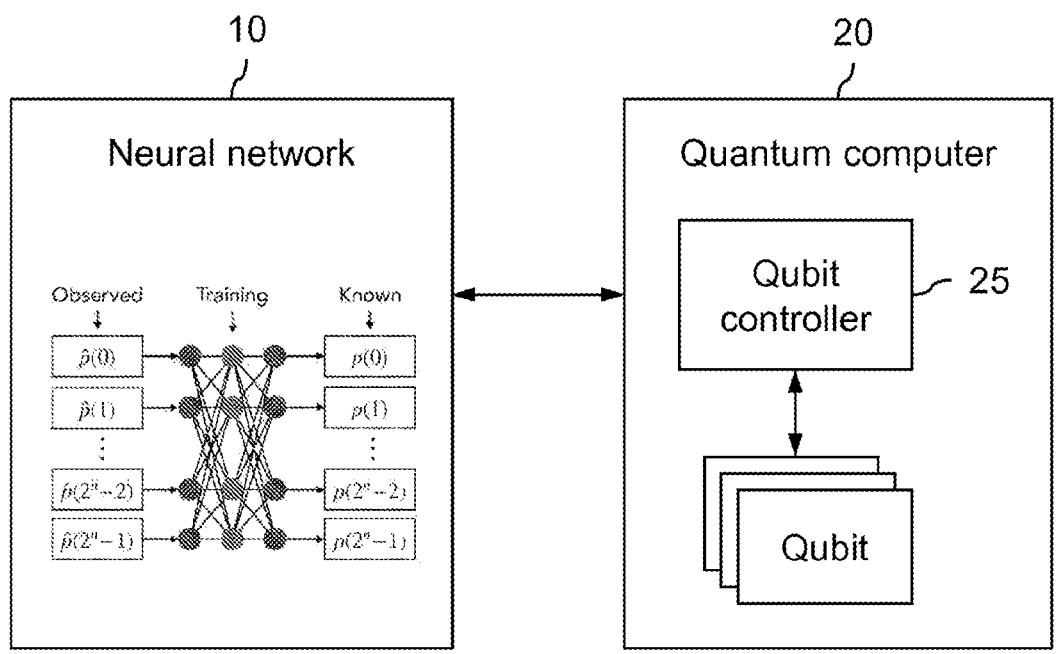
FIG. 8
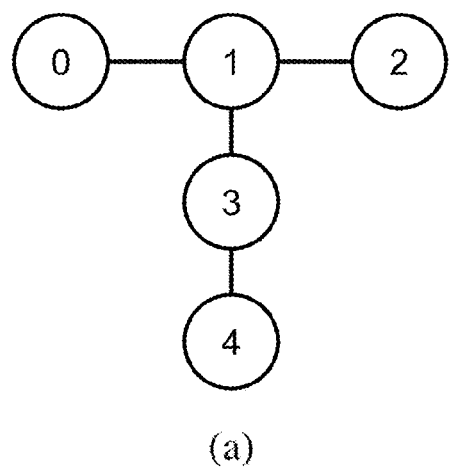
(a)
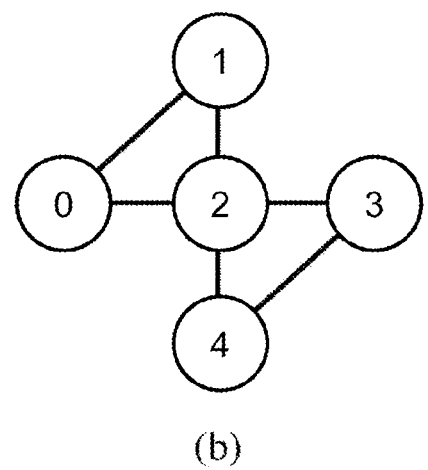
(b)

FIG. 9
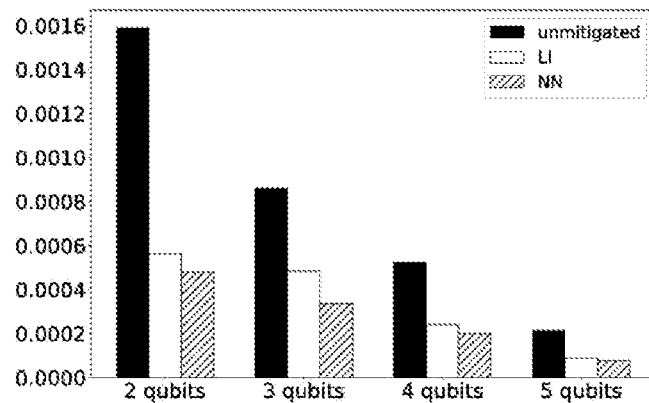
(a) MSE
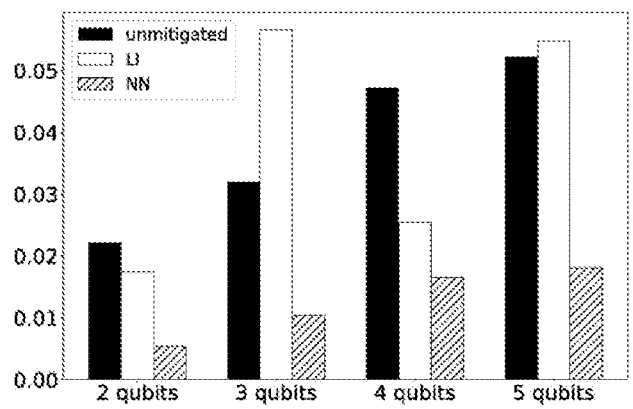
(b) KLD
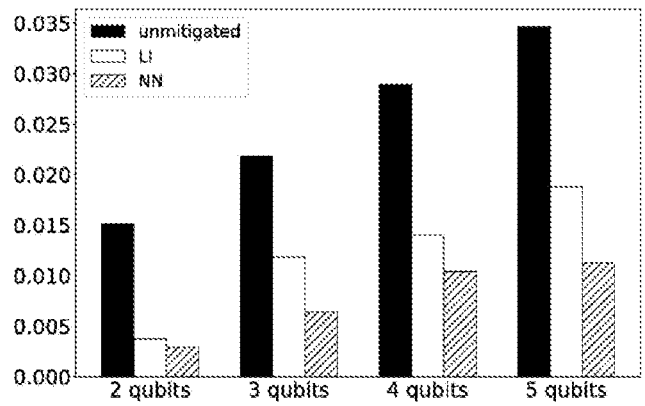
(c) Infidelity

FIG. 10
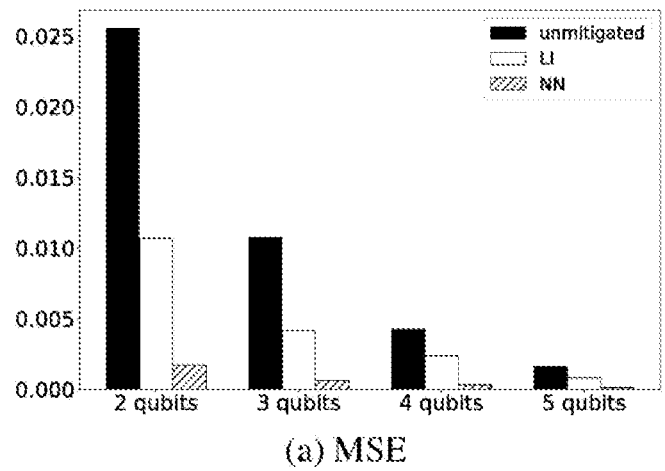
(a) MSE
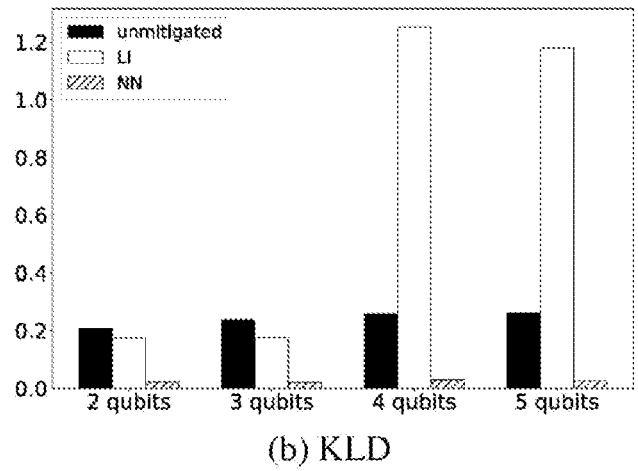
(b) KLD
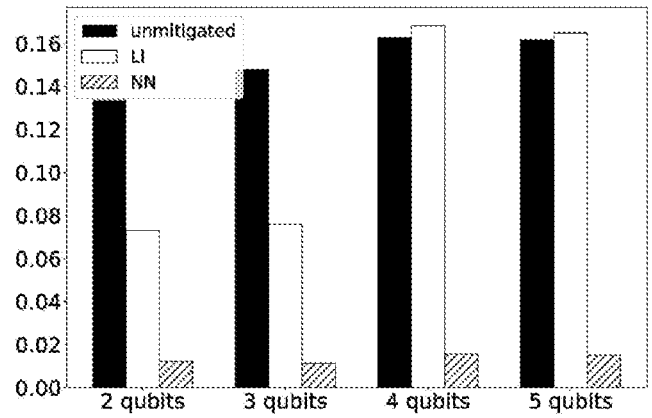
(c) Infidelity

NEURAL NETWORK ESTABLISHING METHOD FOR QUANTUM READOUT, METHOD FOR MITIGATING QUANTUM READOUT ERROR USING NEURAL NETWORK AND APPARATUS THEREOF

CROSS-REFERENCE TO RELATED APPLICATIONS

This application claims the benefit under 35 USC 119(a) of Korean Patent Application No. 10-2021-0171879 filed on Dec. 3, 2021, in the Korean Intellectual Property Office, the entire disclosure of which is incorporated herein by reference for all purposes.

BACKGROUND OF THE DISCLOSURE

Field of the Disclosure

The present disclosure relates to a quantum computer technology that performs operation using physical phenomenon according to the principle of quantum dynamics, particularly, a method of using a neural network to reduce errors that are generated in a quantum readout process, and a method and apparatus for reducing quantum readout errors using the neural network.

Related Art

A quantum computer is a device for performing an operation and a quantum algorithm by controlling the state of a qubit that is the minimum unit of quantum information. A quantum operation process that processes quantum information in a quantum computer needs stable qubits for storing information, a quantum operator (or a quantum gate) that performs an operation on the qubits, a measurer that reads out qubit information, and a quantum error correction circuit for correcting decoherence of qubits and operator errors that are generated in an operation process.

There are several obstacles to solve in order to implement a quantum computer. A quantum computer should maintain a quantum superposition state in an operation process and should check the final result through measurement after an operation is finished. The quantum superposition state is easily changed by an external environment, so it is difficult to maintain quantum superposition state for a predetermined time. An error of a superposition state is accumulated in an operation process, so a reliable result value is not obtained. A quantum computer should be able to stably maintain a superposition state such that it can finish an operation in order to obtain an accurate operation result. A quantum error correction technique is used to protect a quantum superposition state from an error, but more qubits are required to maintain a superposition state of one qubit, which is a severe obstacle to implement a reliable quantum computer.

A quantum computer can be classified in a broad meaning into an analog type and a gate type in accordance with the way of implementing a qubit and an operation circuit. A gate type quantum computer of these types performs a quantum operation and an algorithm through a quantum circuit configuration using a universal gate to solve a problem. For example, IBM Q quantum processor developed by IBM is representative of a gate type quantum computer.

A quantum computing theory secures a considerable computation advantage for solving commercially relevant problems, so it provides many opportunities. One of main technical obstacles to a practical quantum advantage is unavoidable noise and incompletion. A quantum error correction and fault tolerance theory secures that incompletion does not fundamentally deny quantum computation, but the size of a quantum circuit for achieving the theory is out of a short technology. As a result, all physical qubits are expected to operate as logic qubits in short quantum computing, which continues to the age of Noisy Intermediate-Scale Quantum (NISQ). Problems of a quantum computer and error correction means for solving this problem are introduced in the following prior art document.

Accordingly, it is required to reduce quantum computation errors without increasing quantum resource overhead such as the numbers of qubits and gates by developing an algorithm means in the level of software in order to compensate for the gap between a theoretical result and an experimental ability.

PRIOR ART DOCUMENT

Non-Patent Document

Peter W Shor. Scheme for reducing decoherence in quantum computer memory. Physical review A, 52(4):R2493, 1995.

Andrew M Steane. Error correcting codes in quantum theory. Physical Review Letters, 77(5):793, 1996.

SUMMARY OF THE DISCLOSURE

An objective of the present disclosure is to reduce errors that are generated in a quantum readout process of measuring and reading out a result value after a quantum operation is finished, to overcome the limitation in reducing a quantum error ratio due to absence of a technical means that can remove non-linear noise, and to remove inconvenience that a non-physical result is generated sometimes and additional post-processing is required.

In order to achieve the objectives, a method in which a learning apparatus using at least one processor constructs a neural network for quantum readout according to an embodiment of the present disclosure includes: acquiring a plurality of actual measurement results including noise in quantum readout using a quantum circuit by means of the learning apparatus; acquiring an ideal measurement result of the quantum circuit in correspondence to each of the plurality of actual measurement results including noise by means of the learning apparatus; creating training data from a set of the actual measurement results including noise and the ideal measurement results by means of the learning apparatus; and training a neural network for mitigating errors, which are generated in quantum readout, using the created training data by means of the learning apparatus.

In the method of constructing a neural network according to an embodiment, the acquiring of actual measurement results may create a noise probability distribution showing a plurality of actual measurement results including noise in quantum readout by applying certain single qubit rotation to a qubit using a quantum circuit composed of single qubit gates. Further, in the method of constructing a neural network according to an embodiment, the acquiring of ideal measurement results may calculate each ideal probability distribution showing the ideal measurement results of the quantum circuit by measuring qubits on the basis of computation using a rotation angle of the quantum circuit in correspondence to the plurality of actual measurement results including noise.

Further, hereafter, a computer-readable medium in which a program for executing the method of constructing a neural network for quantum readout in a computer is recorded is provided.

In order to achieve the objectives, a method of reducing quantum readout errors according to another embodiment of the present disclosure includes: acquiring a measurement result of a readout object by performing quantum readout by means of a quantum computer; inputting the acquired measurement result of the readout object into a neural network previously constructed in relation to errors, which are generated in quantum readout, by means of the quantum computer; and inferring an ideal measurement result corresponding to the measurement result of the readout object using the neural network by means of the quantum computer, in which the neural network is constructed by acquiring a plurality of actual measurement results including noise in quantum readout using a quantum circuit, acquiring an ideal measurement result of the quantum circuit in correspondence to each of the plurality of actual measurement results including noise, creating training data from a set of the actual measurement results including noise and the ideal measurement results, and training a neural network for mitigating errors that are generated in quantum readout using the created training data.

In order to achieve the objectives, an apparatus for reducing quantum readout errors according to another embodiment of the present disclosure includes: a neural network previously constructed in relation to errors that are generated in quantum readout; and a quantum computer having a qubit controller, acquiring a measurement result of a readout object by performing quantum readout, inputting the acquired measurement result of the readout object into the neural network, and inferring an ideal measurement result corresponding to the measurement result of the readout object using the neural network, in which the neural network is constructed by acquiring a plurality of actual measurement results including noise in quantum readout using a quantum circuit, acquiring an ideal measurement result of the quantum circuit in correspondence to each of the plurality of actual measurement results including noise, creating training data from a set of the actual measurement results including noise and the ideal measurement results, and training a neural network for mitigating errors that are generated in quantum readout using the created training data.

According to embodiments of the present disclosure described above, it is possible to reduce quantum readout errors that are generated while quantum computing is performed, using a neural network and deep learning, remarkably reduce a quantum error ratio by effectively removing nonlinear noise, and to expand the application range of current noisy intermediate scale quantum (NISQ) by always creating a physically effective result.

BRIEF DESCRIPTION OF THE DRAWINGS

FIG. 7 is a block diagram showing an apparatus for reducing quantum readout errors using a neural network according to another embodiment of the present disclosure.

FIG. 8 is a diagram exemplifying a coupling map of a quantum apparatus used in an experiment of implementing a quantum readout error reduction algorithm proposed by embodiments of the present disclosure.

FIGS. 9 and 10 are diagrams exemplifying comparative experiment results in experiments using various quantum apparatuses.

DESCRIPTION OF EXEMPLARY EMBODIMENTS

Before describing embodiments of the present disclosure in detail, technical limitation that pointed out in a quantum computing environment in which the present disclosure is implemented, and technical means that can be considered to solve the limitation are sequentially introduced.

Quantum computation may be considered as a process of three steps composed of input state initialization, single transformation, and readout. A readout step in an experiment is generally implemented by computation-based projective measurement, which reduces an n-qubit final state $|\psi_j\rangle \in \mathbb{C}^{2^n}$ into $|i\rangle$ as a probability $p(i|j)=|\langle i|\psi_j\rangle|^2$, and may be expressed as $p(i):=p(i|j)$ without losing generality. In an ideal (non-error) case, the final result of a quantum algorithm is determined by a probability distribution of a measurement result and is expressed as $p=\{p(0), p(1), \ldots, p(2^n-1)\}$.

Equally, P is a set of diagonal elements of a final density matrix $\rho$ created at the end of quantum computation. Many quantum algorithms are designed in the way solutions for problems are encoded into a probability distribution p. In particular, estimating some expectation values that can be observed in such a probability distribution is the core of many NISQ algorithms such as Variational Quantum Eigensolver (VQE), Quantum Approximate Optimization Algorithm (QAOA), Quantum Machine Learning (QML), and simulation of a probable process.

However, an observed probability distribution may come out of an ideal probability distribution due to a readout error. Hereafter, the probability of observing $|i\rangle$ in an experiment is expressed as $\hat{p}(i)$ and an error map $\mathcal{N}$ that transforms an ideal probability vector into observed a probability is expressed as $\hat{p}=\mathcal{N}(p)$. $\mathcal{N}$ explains transformation of a probability distribution, so 1-norm should be maintained. The objective of quantum readout error mitigation (hereafter, referred to as 'QREM') is to minimize a loss function of the following Equation 1.

$$D(p, \mathcal{N}(p)) \quad \text{[Equation 1]}$$

Equation 1 is defined by partial distance measurement D for a probability distribution.

Figure 1:
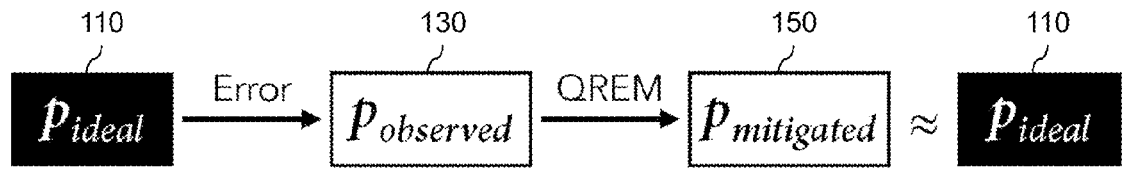
FIG. 1 is a diagram schematically showing ideas proposed by embodiments of the present disclosure to reduce quantum readout errors.

The objective of QREM is conceptually shown in FIG. 1 schematically showing ideas proposed by embodiments of the present disclosure to reduce quantum readout errors.

Referring to FIG. 1, when there is no noise, a fundamental quantum algorithm creates a probability distribution $P_{ideal}$ 110 for computation-based measurement. However, a noise distribution $P_{observed}$ 130 that is out of an actually accurate distribution is obtained due to incompletion and noise. A QREM method is to configure a $P_{mitigated}$ 150 probability distribution as close to the $P_{ideal}$ 110 value as possible on the basis of $P_{observed}$ 130.

QREM is very important particularly in NISQ computing, so several protocols may be considered to solve this problem. It is essentially assumed in such a solving method that a function with noise is linear and depends on solving the linear equation of Equation 2.

$$\hat{p} = \Lambda p \qquad \text{[Equation 2]}$$

wherein a linear response matrix $\Lambda$ is estimated by some tomographic means. This generally requires measurement of $O(2^n)$ under the assumption that a computation-based state preparation error is negligible in comparison to a readout error. It is possible to reduce the number of experiments through specific assumption for a noise model, for example, being subject to a small number of qubit correlations for a short time between a final gate and a sensing event and an independent single qubit Pauli error acting in a final state. $\Lambda$ It is possible to expect an accurate measurement result by computing $\Lambda^{-1}\hat{p}$ after $\Lambda$ is found. This technique is referred to a QREM based on linear inversion (LI) (hereafter, referred to as 'LI-QREM'). Since inversion may create a vector rather than a probability distribution, this approach sometimes needs an additional classical post-processing. In general, readout noise is not static. Accordingly, the QREM procedure described above sometimes needs to be implemented as a portion of a correction routine of a given experiment setting.

Accordingly, embodiments of the present disclosure to be described hereafter propose QREM that shares the same objective as the LI-QREM described above, but approximates $\mathcal{N}^{-1}$ (p) using a deep learning technique rather than linear inversion. That is, embodiments of the present disclosure intend to derive $\mathcal{F} \approx \mathcal{N}^{-1}$ by training a neural network (NN) expressed as $\mathcal{F}$ describing a map p=$\mathcal{F}$ (p̂). Since a deep learning model can process a spurious non-linear effect, an error suppression level is expected over the level that a linear model can achieve. Further, it is possible to make output always show a probability distribution using a softmax function in the final hierarchy of a neural network.

Figure 2:
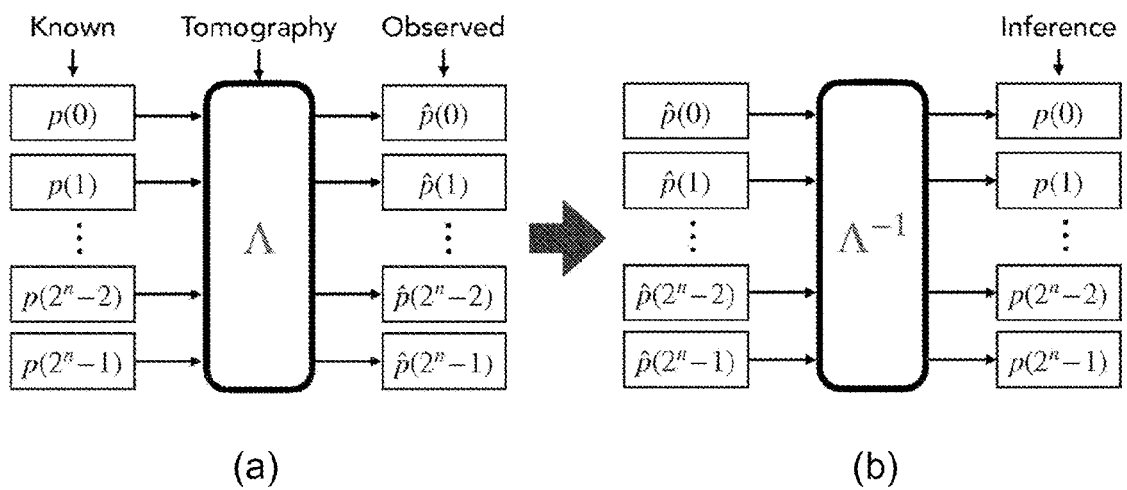
FIG. 2 is a diagram illustrating an error reduction technique using a linear error model and readout tomography.
Figure 3:
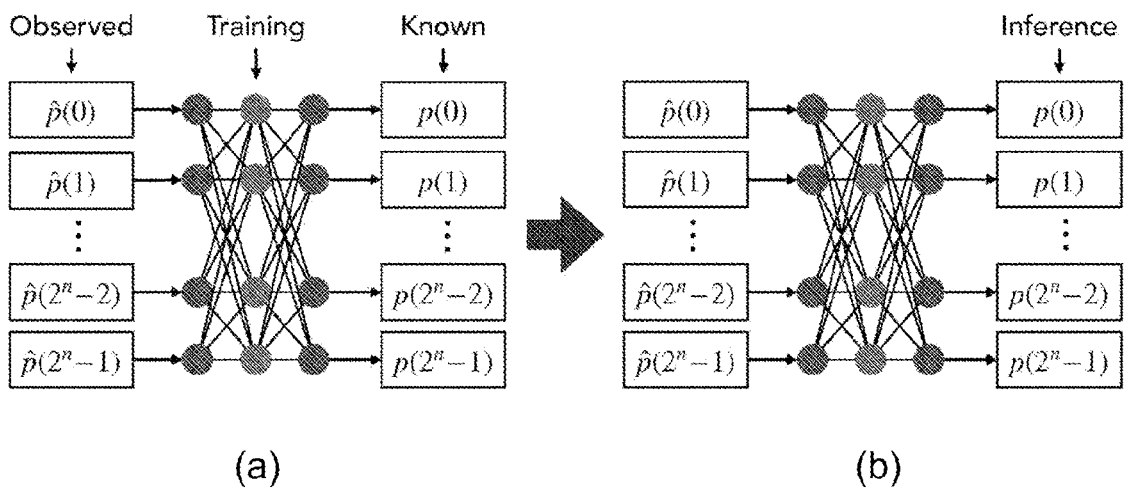
FIG. 3 is a diagram illustrating an error reduction technique using a neural network and deep learning proposed by embodiments of the present disclosure.

FIGS. 2 and 3 show the fundamental idea of LI-QREM and a neural network-based quantum readout error mitigation method (hereafter, referred to as 'NN-QREM') proposed by embodiments of the present disclosure, respectively.

FIG. 2 is a diagram illustrating an error reduction technique using a linear error model and readout tomography. Since it is impossible to remove non-linear noise using such LI-REM, there is limitation in reduction of quantum errors and sometimes a non-physical result is generated, which causes inconvenience that it is required to perform post-optimization.

FIG. 3 is a diagram illustrating an error reduction technique using a neural network and deep learning proposed by embodiments of the present disclosure. Referring to FIG. 3, a deep learning model is trained to implement a function $\mathcal{F}$ that functions as an approximate value to inverse of an actual error map, that is, $\mathcal{F} \approx \mathcal{N}^{-1}$.

As described above, a quantum computing apparatus may necessarily generate an error. In order to use a quantum technology for a computation advantage in an actual application program, a quantum algorithm and a protocol should stably implemented against noise and incompletion. Since noise and incompletion limit the size of a quantum circuit that can be implemented in a quantum apparatus, it is very important to develop a quantum error mitigation technology that does not need additional qubit and gate.

Embodiments of the present disclosure propose a machine learning-based deep learning protocol to solve the problem of reducing readout errors of quantum hardware that are generated in the final step of quantum computation. A neural network proposed by embodiments of the present disclosure is based on training using a measurement result obtained in a simple quantum circuit experiment composed of only a signal qubit gate. To this end, an artificial neural network is trained using an actual measurement result of a quantum circuit of which the final state is known and an ideal measurement result of a circuit that is the same as output. After training, the neural network is used to infer an ideal measurement result from an actual measurement result of certain quantum computation. It is possible to correct non-linear noise that cannot be corrected in a linear inversion method through a neural network and deep learning. Further, since the quantum readout error mitigation (QREM) protocol proposed by embodiments of the present disclosure depends on only existing neural training as a known measurement result, an additional quantum resource is generated only when a measurement result with noise is collected. This is performed in a prepared certain state by applying a certain single qubit gate to a fundamental initial state of a qubit that is a measurement object in a quantum algorithm. Accordingly, this method does not increase the numbers of qubits and gates over the necessity in a quantum algorithm itself.

Hereafter, embodiments of the present disclosure will be described in detail with reference to the drawings. However, well-known function or configurations that may make the spirit of the present description unclear are not described in detail in the following description and the accompanying drawings. Through the present specification, unless explicitly described otherwise, when a component "comprises" any components, it will be understood to imply the inclusion of other components rather than the exclusion of any other components.

Terms used in the present disclosure are used only in order to describe specific exemplary embodiments rather than limiting the present disclosure. Singular forms are intended to include plural forms unless the context clearly indicates otherwise. It will be further understood that the terms "comprises" or "have" used in this specification specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present disclosure belongs. It must be understood that the terms defined by the dictionary are identical with the meanings within the context of the related art, and they should not be ideally or excessively formally defined unless the context clearly dictates otherwise.

Figure 4:
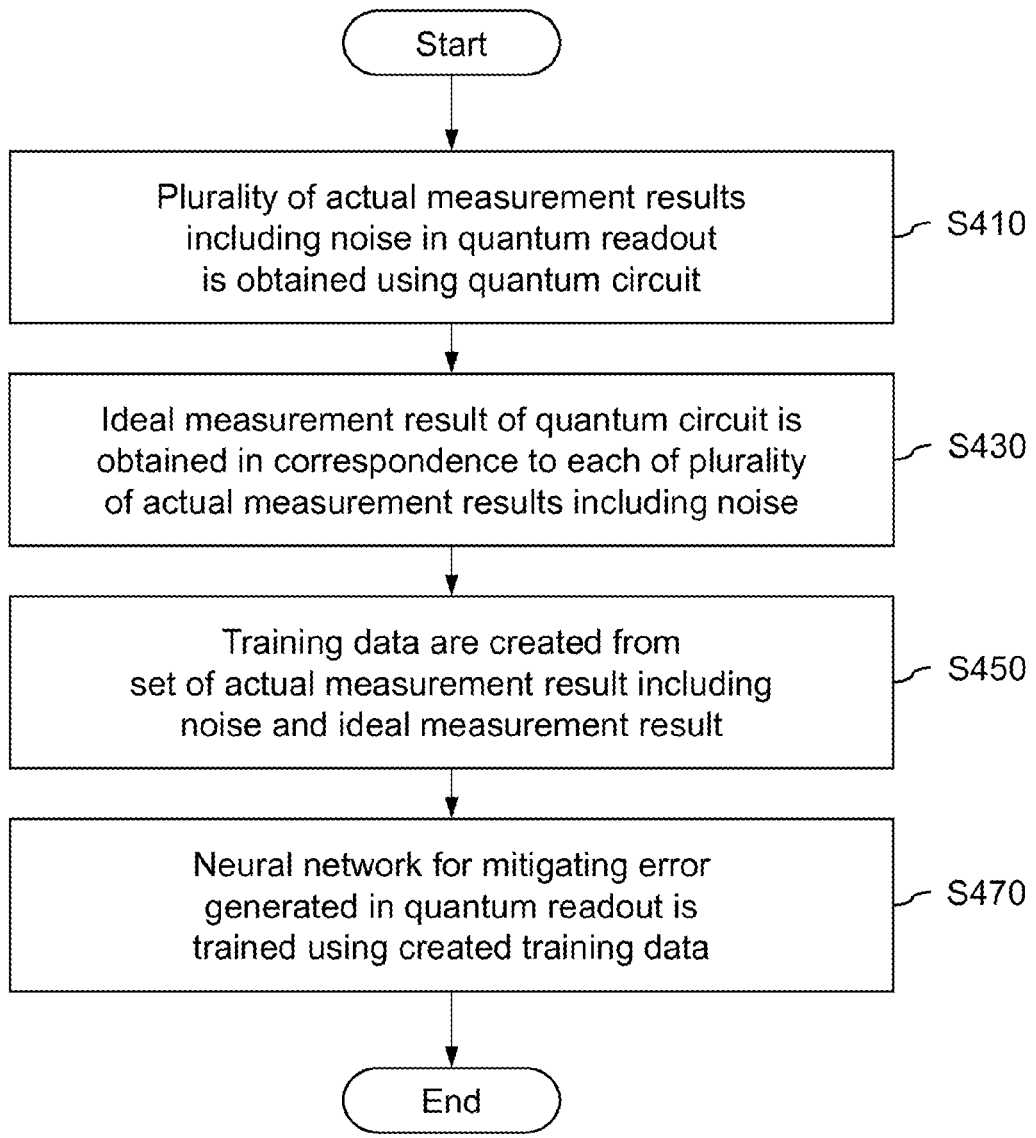
FIG. 4 is a flowchart showing a method of constructing a neural network for quantum readout according to an embodiment of the present disclosure.

FIG. 4 is a flowchart showing a method of constructing a neural network for quantum readout according to an embodiment of the present disclosure, in which a series of processes in which a learning apparatus using at least one processor constructs a neural network for quantum readout. That is, a processor of a learning apparatus loads and executes a program, which is composed of a set of instructions processing the sequential processes proposed in FIG. 4, on a memory, whereby the method can be implemented. A traditional computing technique rather than a quantum apparatus may be used for the learning apparatus, and for example, the learning apparatus may be implemented through a modern machine learning system.

In step S410, the learning apparatus acquires a plurality of actual measurement results including noise in quantum readout using a quantum circuit. In this process, certain single qubit rotation is applied to a qubit using a quantum circuit composed of single qubit gates, whereby it is possible to create a noise probability distribution showing a plurality of actual measurement results including noise in quantum readout.

In order to train a deep neural network for QREM, an ideal measurement result p (known value) and an observed measurement value p̂ (measurement value including noise) are both required. That is, a qubit should be prepared in a known state before measurement. A single qubit gate error is generally negligible in comparison to an error of a 2-qubit gate and measurement of a newest quantum apparatus, so a training set in a quantum state is prepared using only a signal qubit gate in embodiments of the present disclosure.

Figure 5:
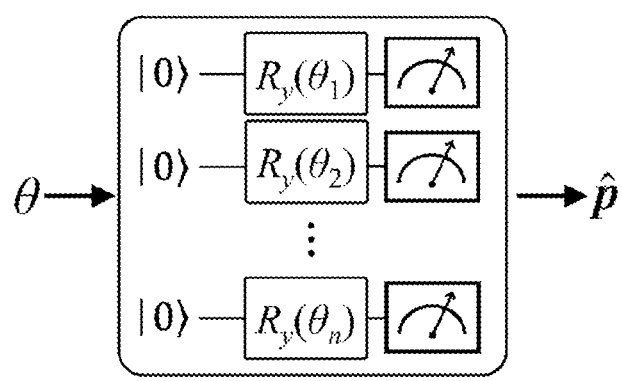
FIG. 5 is a diagram showing a quantum circuit for creating a noise probability distribution that is used as input of a neural network.

FIG. 5 is a diagram showing a quantum circuit for creating noise probability distribution that is used as input of a neural network, which shows a quantum circuit that creates a probability distribution p̂ including noise as input for a neural network for training.

The training set is configured by applying an angle $\theta \in [0, 2\pi)$ randomly and R independently created to all qubits of a system for a $R_y(\theta)$ corresponding to rotation about a y axis of Bloch sphere. That is, training data are created by applying certain single qubit rotation $R_y(\theta)$ to each qubit and measuring the qubits on the basis of computation. Measurement is performed on the basis of computation based on $\sigma_z$ in accordance with custom, so it is not required to apply an $R_z$ gate. Accordingly, a quantum circuit depth for creating training data is 1. In short, the quantum circuit proposed by embodiments of the present disclosure can create a noise probability distribution by applying an angle randomly and independently created to all qubits of a qubit system for a gate corresponding to rotation about one axis of Bloch sphere.

Referring back to FIG. 4, in step S430, the learning apparatus acquires an ideal measurement result of a quantum circuit in correspondence to each of a plurality of actual measurement results including noise. In this process, it is possible to calculate each ideal probability distribution showing the ideal measurement results of the quantum circuit by measuring qubits on the basis of computation using a rotation angle of the quantum circuit in correspondence to the plurality of actual measurement results including noise.

An ideal probability distribution p that is inserted as output of the neural network during training can be easily computed from a rotation angle θ. In an n-qubit system, a probability of measuring a computation-based state $b \in \{0, 1\}^n$ (i.e., an n-bit string) is $$p(b) = \left| \prod_i^n \cos^{1-b_i}(\theta_i/2) \sin^{b_i}(\theta_i/2) \right|^2,$$

in which $b_i$ is the i-th bit of a binary string.

In step S450, the learning apparatus creates training data from the set of the actual measurement results including noise and the ideal measurement results. In this process, a noise probability distribution showing the actual measurement result including noise is set as input as the neural network, an ideal probability distribution showing the ideal measurement result is set as output of the neural network, and the noise probability distribution and the ideal probability distribution are matched, whereby it is possible to create training data composed of each set.

In step S470, the learning apparatus trains a neural network for mitigating errors that are generated in quantum readout using the training data created through step S450. To this end, it is possible to use a deep learning model composed of an input layer showing a probability of measuring a computational base state in actual measurement, a hidden layer composed of a fully connected layer, and an output layer showing a probability of measuring computational base state in an ideal case. The input layer and the output layer has $2^n$ (n is a natural number) nodes, and the values show a probability of measuring a computational base state in an actual experiment and an ideal case, respectively.

Further, the deep learning model can use a Rectified Linear Unit (ReLU) as an activation function of each hidden node, and the output can make output show a probability distribution using a softmax function for activation. A loss function for optimizing a weight and bias of a neural network may be categorical cross entropy that is used in a multi-label classification problem. A free parameter may be updated by an optimizer (e.g., Adam optimizer) in which a hyperparmeter such as a learning rate is heuristically selected.

Accordingly, the noise probability distribution showing an actual measurement result and the ideal probability distribution showing an ideal measurement result of the training data are set as input of the input layer and output of the output layer, respectively, and an ideal measurement result is inferred from an actual measurement result, whereby it is possible to train the deep learning model for mitigating errors that are generated in quantum readout.

Figure 6:
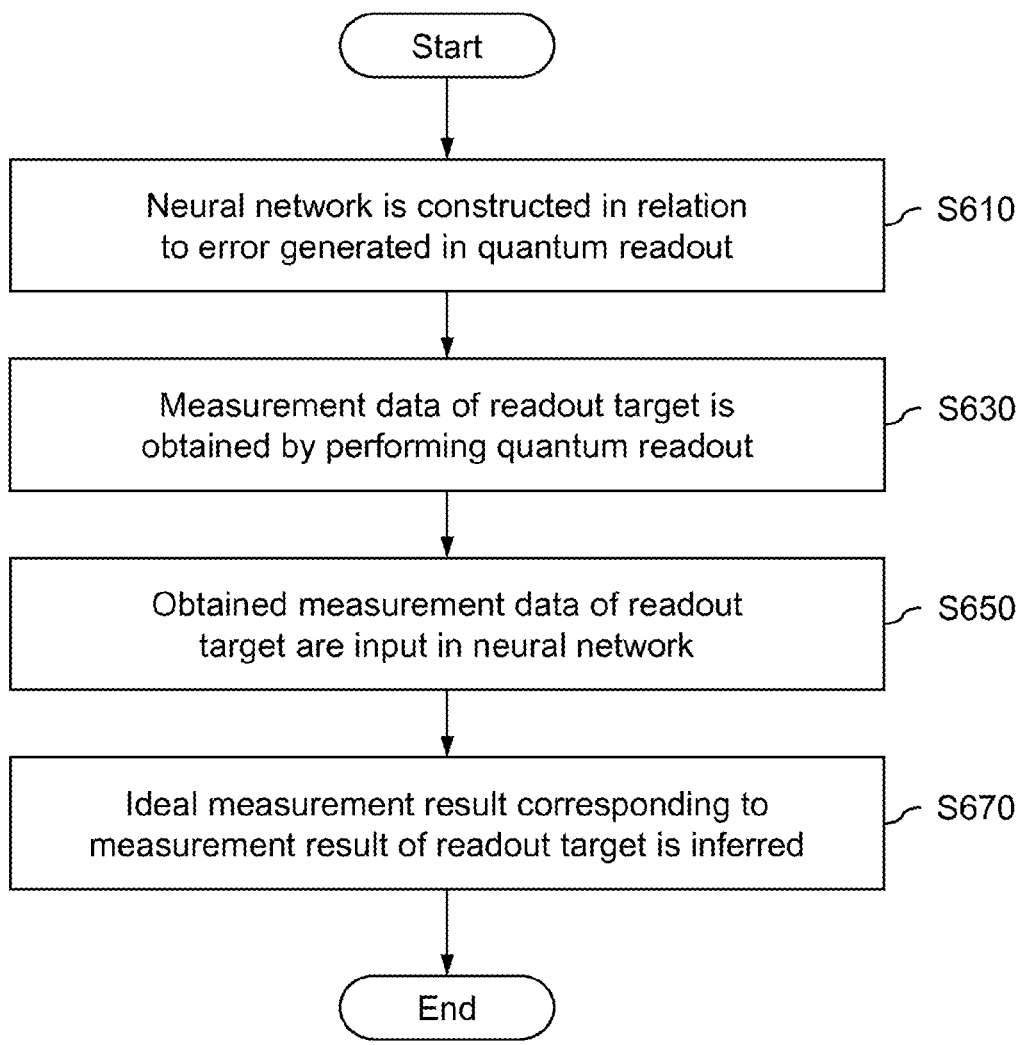
FIG. 6 is a flowchart showing a method of reducing quantum readout errors using a neural network according to another embodiment of the present disclosure.

FIG. 6 is a flowchart showing a method of reducing quantum readout errors using a neural network according to another embodiment of the present disclosure.

In step S610, a neural network is constructed for errors that are generated in quantum readout. The neural network can be constructed by acquiring a plurality of actual measurement results including noise in quantum readout using a quantum circuit, acquiring an ideal measurement result of the quantum circuit in correspondence to each of the plurality of actual measurement results including noise, creating training data from a set of the actual measurement results including noise and the ideal measurement results, and training a neural network for mitigating errors that are generated in quantum readout using the created training data.

The neural network applies certain single qubit rotation to a qubit using a quantum circuit composed of single qubit gates, thereby being able to create a noise probability distribution showing a plurality of actual measurement results including noise in quantum readout. In particular, the quantum circuit can create a noise probability distribution by applying an angle randomly and independently created to all qubits of a qubit system for a gate corresponding to rotation about one axis of Bloch sphere.

Further, the neural network can calculate each ideal probability distribution showing the ideal measurement results of the quantum circuit by measuring qubits on the basis of computation using a rotation angle of the quantum circuit in correspondence to the plurality of actual measurement results including noise. Further, the neural network uses a deep learning model composed of an input layer showing a probability of measuring a computational base state in actual measurement, a hidden layer composed of a fully connected layer, and an output layer showing a probability of measuring computational base state in an ideal case; the noise probability distribution showing an actual measurement result and the ideal probability distribution showing an ideal measurement result of the training data are set as an input of the input layer and output of the output layer, respectively; and an ideal measurement result is inferred from an actual measurement result, whereby it is possible to train the deep learning model for mitigating errors that are generated in quantum readout.

In step S630, a quantum computer acquires a measurement result of a readout object by performing quantum readout. Noise may be included in the measurement result of the readout object in this case, it is an object of quantum readout error mitigation. In this process, quantum readout is performed through computation-based projective measurement, whereby it is possible to acquire a probability distribution in which the final state of a qubit is reduced in a quantum state.

In step S650, the quantum computer inputs the measurement result of the readout object acquired through step S630 into the neural network constructed in advance through step S610 in relation to errors that are generated in quantum readout. In the above description, since the neural network was trained by setting a plurality of actual measurement results including noise and an ideal measurement result of a quantum circuit corresponding to the plurality of actual measurement results as training data, it is possible to infer a new input value.

In step S670, the quantum computer infers an ideal measurement result corresponding to the measurement result of the readout object using the neural network. The trained neural network shows a function $\mathcal{F} \approx \mathcal{N}^{-1}$. Accordingly, an error mitigation probability distribution expressed as $\tilde{p}$ is acquired by inserting $\hat{p}$ from an interest experiment as input for the training neural network. This inference may be expressed as $\tilde{p} = \mathcal{F}(\hat{p}) \approx \mathcal{N}^{-1}(\hat{p})$.

FIG. 7 is a block diagram showing an apparatus for reducing quantum readout errors using a neural network according to another embodiment of the present disclosure, and the apparatus includes a neural network 10 and a quantum computer 20. In this case, the neural network 10 may use a traditional computing technique, and for example, may be implemented through a modern machine learning system. However, the quantum computer 20 may be implemented into quantum hardware that can perform quantum computation through at least one or more qubits.

The neural network 10 is constructed in advance in relation to errors that are generated in quantum readout, acquires a plurality of actual measurement results including noise in quantum readout using a quantum circuit, acquires an ideal measurement result of the quantum circuit in correspondence to each of the plurality of actual measurement results including noise, creates training data from a set of the actual measurement results including noise and the ideal measurement results, and trains a neural network for mitigating errors that are generated in quantum readout using the created training data.

The neural network 10 applies certain single qubit rotation to a qubit using a quantum circuit composed of single qubit gates, thereby being able to create a noise probability distribution showing a plurality of actual measurement results including noise in quantum readout. In this case, the quantum circuit can create a noise probability distribution by applying an angle randomly and independently created to all qubits of a qubit system for a gate corresponding to rotation about one axis of Bloch sphere.

Further, the neural network 10 can calculate each ideal probability distribution showing the ideal measurement results of the quantum circuit by measuring qubits on the basis of computation using a rotation angle of the quantum circuit in correspondence to the plurality of actual measurement results including noise. Further, the neural network 10 uses a deep learning model composed of an input layer showing a probability of measuring a computational base state in actual measurement, a hidden layer composed of a fully connected layer, and an output layer showing a probability of measuring computational base state in an ideal case; the noise probability distribution showing an actual measurement result and the ideal probability distribution showing an ideal measurement result of the training data are set as an input of the input layer and output of the output layer, respectively; and an ideal measurement result is inferred from an actual measurement result, whereby it is possible to train the deep learning model for mitigating errors that are generated in quantum readout.

The quantum computer 20 has a qubit controller 25, acquires a measurement result of a readout object by performing quantum readout, inputs the acquired measurement result of the readout object into the neural network 10, and infers an ideal measurement result corresponding to the measurement result of the readout object using the neural network 10.

Meanwhile, the neural network 10 can be trained on the basis of data created by a primary quantum apparatus and the quantum computer 20 can mitigate noise of a secondary quantum apparatus different from the primary quantum apparatus using the neural network. That is, it is possible to mitigate noise of another apparatus using a neural network trained on the basis of data created by one quantum apparatus, and this method is expected to be operated well particularly in apparatuses having similar hardware characteristics.

Performance of the embodiments of the present disclosure described above has been proved through a quantum readout mitigation experiment performed in an IBM 5-qubit quantum apparatus. Two types of quantum readout mitigation techniques of LI-QREM and NN-QREM proposed by embodiments of the present disclosure were experimented through three different 5-qubit quantum computers that can be used in IBM Quantum Experience. Neural network training and inferring are performed using Keras library by Python. An LI-QREM result is obtained using a fundamental readout error mitigation package by Qiskit Ignis (i.e. CompleteMeasFitter). In order to secure a physical result, a least square method is used to correct a result matrix of Qiskit library.

In a 5-qubit apparatus, 2~5-qubit QREM is performed. Since error mitigation is more important in this apparatus, a quantum apparatus having a smaller quantum volume was selected. Further, different qubit connection apparatuses were selected, as in FIG. 8. FIG. 8 is a diagram exemplifying a coupling map (qubit connection) of an quantum apparatus used in an experiment of implementing a quantum readout error reduction algorithm proposed by embodiments of the present disclosure. In the first array ((a) of FIG. 8), two types of quantum apparatuses of ibmq_quito and ibmq_belem were selected in accordance with the amount of standby arrays of a cloud service to minimize an experiment time. 2-qubit and 3-qubit QREM was performed in ibmq_quito, and 4-qubit and 5-qubit QREM was performed in ibmq_belem. In the second array ((b) of FIG. 8), ibmq_qx2 was selected. Accordingly, 2~5-qubit experiments were all implemented in this apparatus.

It is required to correct several hyperparameters when training a neural network. The number of nodes in each hidden layer was set as $5 \times 2^n$ (n is a natural number) in the proposed experiment so that the number of nodes expands only linearly with the magnitude of a probability distribution. A learning rate of Adam optimization algorithm was finely adjusted for each number of qubits. The number of hidden layers was optimized using 5-fold cross examination. Hyperparameters of a neural network used in the NN-QREM experiment were provided, as in Table 1 and Table 2, for the two types of apparatuses shown in FIG. 8.

TABLE 1

|  | Num. of qubits | | | |
|---|---|---|---|---|
|  | 2 | 3 | 4 | 5 |
| Num. of training data | 1175 | 3472 | 9700 | 9700 |
| Num. of test data | 200 | 200 | 200 | 200 |
| Num. of hidden layer | 7 | 3 | 5 | 5 |
| Num. of nodes in each hidden layer | 20 | 40 | 80 | 160 |
| Num. of epochs | 300 | 300 | 300 | 300 |
| Learning rate | 0.001 | 0.001 | $5 \times 10^{-5}$ | $5 \times 10^{-5}$ |

Table 1 exemplifies the hyperparametetrs and training details of a neural network used in 2~5-qubit NN-QREM experiments by ibmq_belem and ibmq_quito.

TABLE 2

|  | Num. of qubits | | | |
|---|---|---|---|---|
|  | 2 | 3 | 4 | 5 |
| Num. of training data | 1800 | 3800 | 7800 | 9850 |
| Num. of test data | 200 | 200 | 200 | 200 |
| Num. of hidden layer | 6 | 3 | 8 | 6 |
| Num. of nodes in each hidden layer | 20 | 40 | 80 | 160 |
| Num. of epochs | 300 | 300 | 300 | 300 |
| Learning rate | 0.001 | 0.001 | $5 \times 10^{-5}$ | $5 \times 10^{-5}$ |

Table 2 exemplifies the hyperparametetrs and training details of a neural network used in 2~5-qubit NN-QREM experiments by ibmq_qx2.

As for a loss function, in a proposed experiment, the amount of readout error mitigation is quantified, and three types methods of different distance measurement (refer to Equation 1) are evaluated to compare performance of different QREM methods. Metrics that are used for comparison are mean squared error (MSE)

$$D_{MSE} = \frac{1}{2^n} \sum_{i=0}^{2^n-1} |\tilde{p}_i - p_i|^2, \text{ Kullback–Leibler divergence} \quad \text{(KLD)}$$

$$D_{KLD} = \sum_{i=0}^{2^n-1} p_i \log \frac{p_i}{\tilde{p}_i}, \text{ and infidelity} \quad \text{(IF)}$$

$$D_{IF} = 1 - \left( \sum_{i=0}^{2^n-1} \sqrt{p_i \tilde{p}_i} \right)^2,$$

where $p_i$ and $\tilde{p}_i$ are the i-th elements in an ideal probability distribution and a mitigated probability distribution, respectively. The smaller all of the measurement values, the higher the measurement values show similarity, so better performance is shown. Further, the infidelity is the same as quantum state infidelities of two diagonal density matrixes.

Hereafter, MSE, KLD, and IF of ① an original probability distribution p̂ (with severe noise), ② an LI-QREM $\tilde{p}_{LI}$, and ③ an NN-QREM result $\tilde{p}_{NN}$ averaged for 200 test data are introduced. The QREM result is shown in FIGS. 9 and 10 for apparatus types (a) and (b), respectively.

FIGS. 9 and 10 are diagrams exemplifying comparative experiment results in experiments using various quantum apparatuses. FIG. 9 shows experimental QREM results for reducing (a) MSE, (b) KLD, and (c) infidelity of ibmq_quito and ibmq_belem, in which the solid bars show non-mitigated results, non-solid bars show LI-QREM results, and hatched bars show NN-QREM results. Further, FIG. 10 shows experimental QREM results for reducing (a) MSE, (b) KLD, and (c) infidelity of ibmq_qx2, in which the solid bars show non-mitigated results, non-solid bars show LI-QREM results, and hatched bars show NN-QREM results. Referring to the experimental results, it is seen that NN-QREM can more effectively reduce readout noise than LI-QREM. Interestingly, it is seen that LI-QREM cannot reduce KLD, depending cases, but NN-QREM can reduce all of errors in all cases.

In order to quantitatively compare the two methods, a performance improvement ratio for each loss function $D_i$ in which subscript 'i' is MSE, KLD, or IF was defined as in the following Equation 3.

$$R_i = \frac{D_i^{LI} - D_i^{NN}}{D_i^{NN}} \times 100 (\%) \quad \text{[Equation 3]}$$

wherein the superscripts show whether the result was from LI-QREM or NN-QREM. In accordance with the definition of $R_i$, $R_i > 0$ means that NN-QREM is better than LI-QREM, and vice versa.

Table 3 shows a performance improvement ratio of metrics and the values in Table 3 show that NN-QREM is better in performance than LI-QREM in all instances.

TABLE 3

|  |  | Num. of qubits | | | |
|---|---|---|---|---|---|
|  |  | 2 | 3 | 4 | 5 |
| Device Type (a) | $R_{MSE}$ | 17.5 | 42.9 | 17.3 | 13.1 |
|  | $R_{KLD}$ | 69.2 | 81.6 | 37.5 | 67.5 |
|  | $R_{IF}$ | 27.2 | 85.6 | 34.7 | 66.0 |
| Device Type (b) | $R_{MSE}$ | 518 | 569 | 617 | 570 |
|  | $R_{KLD}$ | 700 | 740 | 4174 | 4193 |
|  | $R_{IF}$ | 503 | 569 | 966 | 1003 |

Referring to Table 3, a performance improvement ratio $R_i$ was shown for all metrics (e.g., MSE, KLD, and IF) tested in this work for each qubit number, and these numbers are classified into the two different types of apparatuses shown in FIG. 8 and shown as a type (a) and a type (b). In particular, it could be found that NN-QREM is operated better particularly in the apparatus type (b).

An interesting question is whether it is possible to mitigate noise of different quantum apparatuses using a neural network trained on the basis of data created by one quantum apparatus. This method is expected to be operated well particularly in apparatuses having similar hardware characteristics. Since there is similar hardware design having the same qubit connectivity, this ideal was experimented in ibmq_quito and ibmq_belem. In particular, readout errors of a data set of ibmq_belem were mitigated by applying a neural network trained with a data set created by ibmq_quito, and vice versa. The corresponding QREM result is as in Table 4.

TABLE 4

|  |  | Num. of qubits | |
|---|---|---|---|
|  |  | 2 | 3 |
| ibmq_quito to ibmq_belem | $R_{MSE}$ | 6.55 | −10.8 |
|  | $R_{KLD}$ | 379 | 470 |
|  | $R_{IF}$ | 82.5 | 71.4 |

Referring to Table 4, a performance improvement ratio $R_i$ for three types of metrics (i.e., MSE, KLD, and IF) for mitigating readout errors of ibmq_belem using a data set acquired from ibmq_quito was shown. The experiment result showed that NN-QREM is better than LI-QREM in most case, particularly, in KLD and IF. In MSE, NN-QREM showed better performance only for a smaller number of qubits.

In general, readout noise is not static. Accordingly, QREM should be intentionally and frequently performed as a portion of an experiment correction routine. A large cost may be required to both LI and NN-QREM procedures, so it is preferable to design QREM to be strong against drift. To this end, a period for which a linear error matrix determined at one point in time and a neural network continuously create a useful QREM result over time was tested. In more detail, 5-qubit QREM was performed in ibmq_belem once a day for 11 days using a predetermined error matrix and a previously trained neural network that is previously provided. Two QREM methods both reduced all loss functions $D_i$ for a subscript that is MSE, KLD, or IF for 11 days, but NN-QREM shows better performance than LI-QREM.

Embodiments of the present disclosure proposed a quantum readout error mitigation protocol based on deep learning using a neural network. It has been known that deep learning is useful to find out a nonlinear relationship in a data set, and was used to mitigate a nonlinear effect in readout errors. Therefore, according to embodiments of the present disclosure, it is possible to an error mitigation level that cannot be achieved through a method depending on a linear error model, and this was clearly proved through a principle verification experiment using 2~5 superconductive qubits.

Another promising strategy for reducing a computation cost is transfer imaging. Transfer imaging takes aim at improving training of a new machine learning model using a reference machine learning model previously trained for work that is different because of using different data set, but related. It was actually proved that a potential advantage of transfer learning is to mitigate errors of a data set of ibmq_belem using a neural network trained with data of ibmq_quito, and vice versa. It is possible to greatly reduce the number of hierarchies to be trained by implementing NN-QREM by finely adjusting a neural network previously trained through reference quantum hardware. Transfer learning may be useful even when system parameters of a quantum processor are drifted over time. In this case, it is possible to greatly reduce the entire computation cost by using transfer learning in order to reuse a neural network trained at a reference point in time. Transfer learning has a potential of being able to reduce the number of deep learning hierarchies that are objects to be trained, but the numbers of input and output nodes increase in geometric progression in accordance with the number of qubits. Unless the number of repetition increases in geometric progression in accordance with n, a probability vector configured through sampling an quantum circuit is sparse. It is possible to make a plan to examine machine learning methods for sparse dat4a in order to search for a possibility of designing a QREM algorithm expandable on the basis of this observation.

According to the embodiments of the present disclosure described above, it is possible to reduce quantum readout errors that are generated while quantum computing is performed, using a neural network and deep learning, remarkably reduce a quantum error ratio by effectively removing nonlinear noise, and to expand the application range of current noisy intermediate scale quantum (NISQ) by always creating a physically effective result.

Meanwhile, embodiments of the present disclosure, particularly, the method in which a learning apparatus constructs a neural network for quantum readout can be implemented into computer-readable codes in a computer-readable recording medium. The computer-readable medium includes all kinds of recording devices that keep data that can be read by a computer system.

The computer-readable recording medium, for example, may be a ROM, a RAM, a CD-ROM, a magnetic tape, a floppy disk, an optical data storage device, etc. Further, the computer-readable recording media may be distributed to computer systems that are connected through a network and may store and execute computer-readable codes in the type of distribution. Further, functional programs, codes, and code segments for implementing the present disclosure may be easily inferred by programmers in the art.

Various embodiments of the present disclosure were described above. It would be understood by those skilled in the art that the present description may be modified with departing from the scope of the present description. Therefore, the disclosed embodiments should be considered in terms of explaining, not limiting. The scope of the present disclosure is not shown in the above description, but claims, and all differences within an equivalent range should be construed as being included in the present disclosure.

What is claimed is:

1. A method in which a learning apparatus using at least one processor constructs a neural network for quantum readout, the method comprising:
   acquiring a plurality of actual measurement results including noise in quantum readout using a quantum circuit by means of the learning apparatus;
   acquiring an ideal measurement result of the quantum circuit in correspondence to each of the plurality of actual measurement results including noise by means of the learning apparatus;
   creating training data from a set of the actual measurement results including noise and the ideal measurement results by means of the learning apparatus; and training a neural network for mitigating errors, which are generated in quantum readout, using the created training data by means of the learning apparatus.

2. The method of claim 1, wherein the acquiring of actual measurement results creates a noise probability distribution showing a plurality of actual measurement results including noise in quantum readout by applying certain single qubit rotation to a qubit using a quantum circuit composed of single qubit gates.

3. The method of claim 2, wherein the quantum circuit creates the noise probability distribution by applying an angle randomly and independently created to all qubits of a qubit system for a gate corresponding to rotation about one axis of Bloch sphere.

4. The method of claim 1, wherein the acquiring of ideal measurement results calculates each ideal probability distribution showing the ideal measurement results of the quantum circuit by measuring qubits on the basis of computation using a rotation angle of the quantum circuit in correspondence to the plurality of actual measurement results including noise.

5. The method of claim 1, wherein the creating of training data
sets a noise probability distribution showing the actual measurement results including noise as input of the neural network,
sets an ideal probability distribution showing the ideal measurement results as output of the neural network, and
creates training data composed of each set by matching the noise probability distribution and the ideal probability distribution.

6. The method of claim 1, wherein the training of a neural network uses a deep learning model composed of an input layer showing a probability of measuring a computational base state, a hidden layer composed of a fully connected layer, and an output layer showing a probability of measuring computational base state in an ideal case, and
a noise probability distribution showing actual measurement results and an ideal probability distribution showing the ideal measurement results of the training data are set as input of the input layer and output of the output layer, respectively, and an ideal measurement result is inferred from an actual measurement result, thereby training the deep learning model for mitigating errors that are generated in quantum readout.

7. The method of claim 6, wherein the deep learning model uses a Rectified Linear Unit (ReLU) as an activation function of each hidden node,
the output layer uses a softmax function such that output shows a probability distribution,
a loss function optimizes a weight and bias of a neural network using categorical cross entropy, and
a free parameter is updated by an optimizer in which a hyperparmeter such as a learning rate is heuristically selected.

8. One or more non-transitory computer-readable medium storing one or more instructions, wherein the one or more instructions that can be executed by one or more processors
acquires a plurality of actual measurement results including noise in quantum readout using a quantum circuit,
acquires an ideal measurement result of the quantum circuit in correspondence to each of the plurality of actual measurement results including noise,
creates training data from a set of the actual measurement results including noise and the ideal measurement results, and
trains a neural network for mitigating errors, which are generated in quantum readout, using the created training data.

9. A method of reducing quantum readout errors, the method comprising:
acquiring a measurement result of a readout object by performing quantum readout by means of a quantum computer;
inputting the acquired measurement result of the readout object into a neural network previously constructed in relation to errors, which are generated in quantum readout, by means of the quantum computer; and
inferring an ideal measurement result corresponding to the measurement result of the readout object using the neural network by means of the quantum computer,
the neural network is constructed by acquiring a plurality of actual measurement results including noise in quantum readout using a quantum circuit, acquiring an ideal measurement result of the quantum circuit in correspondence to each of the plurality of actual measurement results including noise, creating training data from a set of the actual measurement results including noise and the ideal measurement results, and training a neural network for mitigating errors that are generated in quantum readout using the created training data.

10. The method of claim 9, wherein the acquiring a measurement result of a readout object acquires a probability distribution, in which a final state of a qubit is reduced in a quantum state, by performing quantum readout through computation-based projective measurement.

11. The method of claim 9, wherein the neural network creates a noise probability distribution showing a plurality of actual measurement results including noise in quantum readout by applying certain single qubit rotation to a qubit using a quantum circuit composed of single qubit gates.

12. The method of claim 11, wherein the quantum circuit creates the noise probability distribution by applying an angle randomly and independently created to all qubits of a qubit system for a gate corresponding to rotation about one axis of Bloch sphere.

13. The method of claim 9, wherein the neural network calculates each ideal probability distribution showing the ideal measurement results of the quantum circuit by measuring qubits on the basis of computation using a rotation angle of the quantum circuit in correspondence to the plurality of actual measurement results including noise.

14. The method of claim 9, wherein the neural network uses a deep learning model composed of an input layer showing a probability of measuring a computational base state in actual measurement, a hidden layer composed of a fully connected layer, and an output layer showing a probability of measuring computational base state in an ideal case; the noise probability distribution showing an actual measurement result and the ideal probability distribution showing an ideal measurement result of the training data are set as an input of the input layer and output of the output layer, respectively; and an ideal measurement result is inferred from an actual measurement result, thereby training the deep learning model for mitigating errors that are generated in quantum readout.

15. An apparatus for reducing quantum readout errors, the apparatus comprising:
a neural network previously constructed in relation to errors that are generated in quantum readout; and
a quantum computer having a qubit controller, acquiring a measurement result of a readout object by performing quantum readout, inputting the acquired measurement result of the readout object into the neural network, and inferring an ideal measurement result corresponding to the measurement result of the readout object using the neural network, wherein the neural network is constructed by acquiring a plurality of actual measurement results including noise in quantum readout using a quantum circuit, acquiring an ideal measurement result of the quantum circuit in correspondence to each of the plurality of actual measurement results including noise, creating training data from a set of the actual measurement results including noise and the ideal measurement results, and training a neural network for mitigating errors that are generated in quantum readout using the created training data.

16. The apparatus of claim 15, wherein the neural network creates a noise probability distribution showing a plurality of actual measurement results including noise in quantum readout by applying certain single qubit rotation to a qubit using a quantum circuit composed of single qubit gates.

17. The apparatus of claim 16, wherein the quantum circuit creates the noise probability distribution by applying an angle randomly and independently created to all qubits of a qubit system for a gate corresponding to rotation about one axis of Bloch sphere.

18. The apparatus of claim 15, wherein the neural network calculates each ideal probability distribution showing the ideal measurement results of the quantum circuit by measuring qubits on the basis of computation using a rotation angle of the quantum circuit in correspondence to the plurality of actual measurement results including noise.

19. The apparatus of claim 15, wherein the neural network uses a deep learning model composed of an input layer showing a probability of measuring a computational base state in actual measurement, a hidden layer composed of a fully connected layer, and an output layer showing a probability of measuring computational base state in an ideal case; the noise probability distribution showing an actual measurement result and the ideal probability distribution showing an ideal measurement result of the training data are set as an input of the input layer and output of the output layer, respectively; and an ideal measurement result is inferred from an actual measurement result, thereby training the deep learning model for mitigating errors that are generated in quantum readout.

20. The apparatus of claim 15, wherein the neural network is trained on the basis of data created by a primary quantum apparatus, and the quantum computer mitigates noise of a secondary quantum apparatus different from the primary quantum apparatus using the neural network.

* * * * *